UNITED STATES PATENT OFFICE.

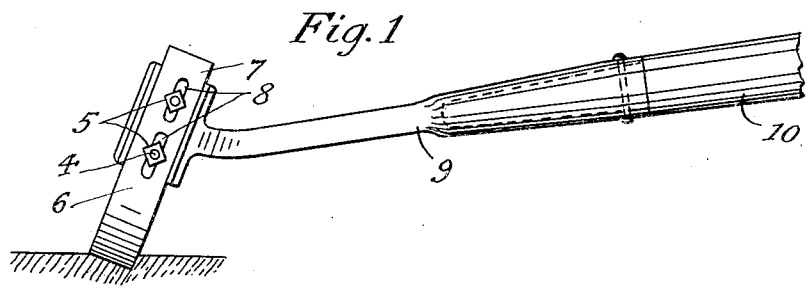
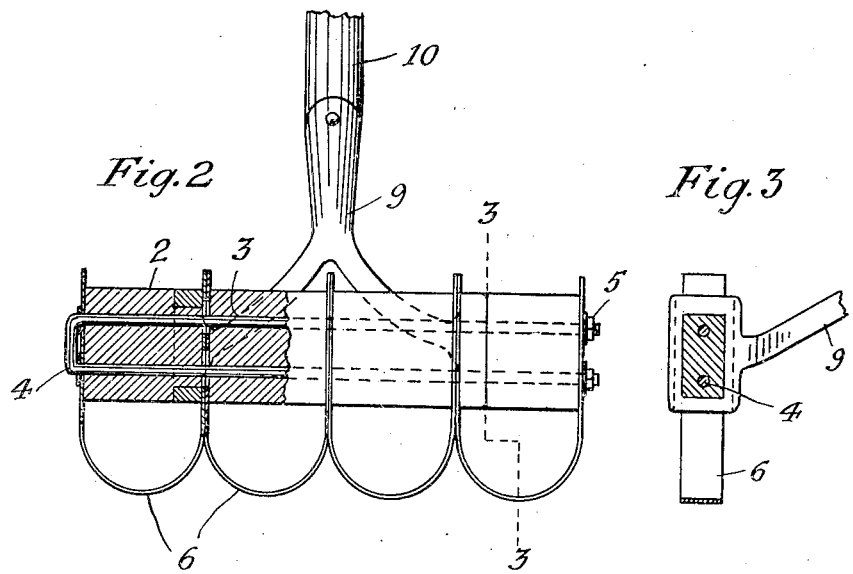
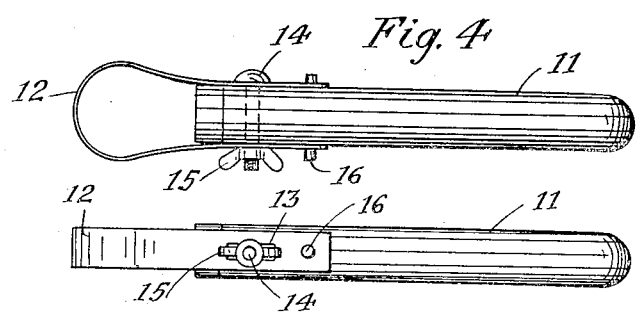
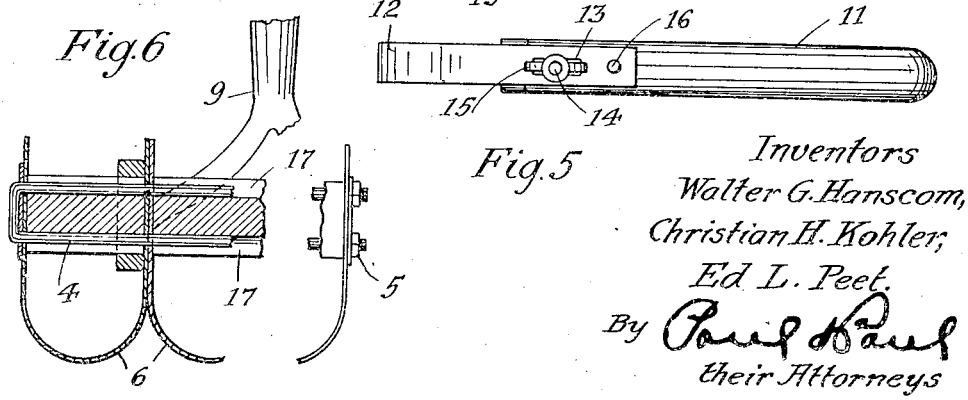

WALTER G. HANSCOM, CHRISTIAN H. KOHLER, AND ED L. PEET, OF MINNEAPOLIS, MINNESOTA.

WEED-CUTTING TOOL.

1,354,969. Specification of Letters Patent. Patented Oct. 5, 1920.

Application filed July 11, 1918. Serial No. 244,373.

*To all whom it may concern:*

Be it known that we, WALTER G. HANSCOM, CHRISTIAN H. KOHLER, and ED L. PEET, citizens of the United States, residents of Minneapolis, county of Hennepin, State of Minnesota, have invented certain new and useful Improvements in Weed-Cutting Tools, of which the following is a specification.

The object of our invention is to provide a tool by means of which weeds and grass growing around plants or between the rows can be easily and quickly cut off and destroyed.

A further object is to provide a tool made up of a series of units or sections which are separable and the number of which can be increased or decreased in the head of the tool to adapt it for the different purposes for which the tool is made, and embodied either in a hand or power operated implement.

Other objects of the invention will appear from the following detailed description.

The invention consists generally in various constructions and combinations, all as hereinafter described and particularly pointed out in the claims.

In the accompanying drawings forming part of this specification,

Figure 1 is an end view of a tool or implement embodying our invention,

Fig. 2 is a front view, partially in section, of the same,

Fig. 3 is a vertical sectional view on the line 3—3 of Fig. 2,

Fig. 4 is a plan view of a single unit and handle therefor adapted for working around small plants, Fig. 5 is an edge view of the same, Fig. 6 is a detail view of a modified construction.

In the drawing, 2 represents the head of the tool or implement. This head is made up preferably of a series of sections or blocks placed end to end and having holes 3 extending lengthwise therethrough to receive the arms of a substantially U-shaped bolt 4. The loop at one end of the bolt bears on the outer block and the other end of the bolt is provided with lock nuts 5 by means of which it may be tightened in the head. These blocks are interchangeable and separable so that the device can be increased or decreased in width to adapt it for the different distances between the rows of plants or for different kinds of work for which the tool may be used.

6 represents a series of metallic cutters, bent into the form of a U and having parallel end portions 7 provided with longitudinal slots 8 to receive the bolt 4 and on which bolt by means of said slots the cutter blades are adjustable. The outer arms of the outer blades are seated against the outer block, while the inner arms of the blades are clamped between the blocks and held rigidly when the bolt 4 is tightened. By loosening the bolt, either arm of a blade may be adjusted and the curvature of its cutting edge changed to adapt it for different kinds of work. In the drawing, Fig. 2, the blades are shown each with a symmetrical curve, but by the adjustment of one arm the curvature may be changed and by drawing in both arms the arc of the blade may be made shorter and the cutting edge stiffer and less flexible when the blade is drawn through the soil. These blades are preferably composed of flat spring steel and are mounted preferably as shown in Fig. 1, a forked shank 9 being provided, having a socket to receive the usual wooden handle 10. The angle of the blades with respect to the soil may be easily and quickly changed by tilting the handle so that the blade will move along parallel with the surface to cut off the weeds and grass or, at slight incline with respect thereto, and as the blade is formed with a forward and rear cutting edge, the tool may be pushed as well as pulled, through the soil, the usual method being to slide it back and forth toward or from the operator, cutting the weeds and grass with each movement.

We have shown four of the separable blades mounted side by side, but by varying the length of the securing bolt and the number of blocks used, the blades may be increased or decreased in number as the use of the tool may make advisable.

In Figs. 4 and 5 we have shown the invention adapted for a small tool to be used in one hand, 11 representing the handle, 12 the weed cutting blade having slots 13 therein to receive a securing bolt 14 provided with a wing nut 15. By loosening this nut, the blade may be adjusted back and forth on the handle to vary its degree of curvature at the cutting edge. The pin 16 is inserted through the ends of the blade and through the handle 11 to hold the blade in alinement therewith.

In Fig. 6 we have shown a modified construction, which consists in providing independent filler blocks 17 having longitudinal grooves therein into which the arms of the bolt 4 are inserted, the number of these blocks being increased or decreased according to the desired width of the tool. The blades used in this construction correspond to those described with reference to the previous figures.

We claim as our invention:

1. A weed cutting tool comprising a head, a plurality of weed cutting blades mounted therein and composed of spring material, the ends of said blades being mounted for longitudinal adjustment in said head for varying the angle of said blades with respect to the soil, and the degree of curvature thereof, and said blades having forward and rear cutting edges to adapt the tool for pulling or pushing through the soil.

2. A weed cutting tool comprising a head made up of a series of sections, independent weed cutting blades, U-shaped substantially in form, having their end portions mounted in said head and their curved portions provided with forward and rear cutting edges, said blades and head sections being separable for increasing or decreasing the size of the tool, and means for securing said sections and blades together.

3. A weed cutting tool comprising a head, a series of weed cutting blades mounted therein and composed of spring material having forward and rear cutting edges to adapt the tool for pulling or pushing through the soil, said blades being mounted to yield under pressure in the soil.

4. A weed cutting tool comprising a head, a series of cutting blades having curved cutting edges and end portions seated in said head, said end portions having slots therein and means passing through said slots and securing said blades in said head, said securing means, when released, allowing the adjustment of the ends of said blades for varying the degree of curvature thereof.

5. A weed cutting tool comprising a head made up of a series of independent blocks and means for securing the blocks together in end to end relation, weed cutting blades having their end portions secured between said blocks and provided with curved flexible cutting edges.

In witness whereof, we have hereunto set our hands this 26th day of June, 1918.

WALTER G. HANSCOM.
CHRISTIAN H. KOHLER.
ED L. PEET.